United States Patent
Knoll, Jr.

(10) Patent No.: US 9,480,368 B2
(45) Date of Patent: Nov. 1, 2016

(54) ARRANGEMENT FOR FASTENING A SHELF DEVICE

(71) Applicant: Alexander Knoll, Sr., Gaildorf (DE)

(72) Inventor: Alexander Knoll, Jr., Gaildorf (DE)

(73) Assignee: Alexander Knoll, Sr., Gaildorf (DE)

( * ) Notice: Subject to any disclaimer, the term of this patent is extended or adjusted under 35 U.S.C. 154(b) by 0 days.

(21) Appl. No.: 14/419,973

(22) PCT Filed: Jul. 31, 2013

(86) PCT No.: PCT/EP2013/066050
§ 371 (c)(1),
(2) Date: Feb. 6, 2015

(87) PCT Pub. No.: WO2014/023621
PCT Pub. Date: Feb. 13, 2014

(65) Prior Publication Data
US 2015/0216366 A1 Aug. 6, 2015

(30) Foreign Application Priority Data
Aug. 8, 2012 (DE) .................. 10 2012 015 574

(51) Int. Cl.
*A47K 3/28* (2006.01)
*A47B 57/04* (2006.01)
(Continued)

(52) U.S. Cl.
CPC ............ *A47K 3/281* (2013.01); *A47B 47/022* (2013.01); *A47B 57/045* (2013.01); *A47B 96/021* (2013.01); *A47B 96/022* (2013.01); *A47B 96/027* (2013.01)

(58) Field of Classification Search
CPC ...... A47B 57/42; A47B 57/52; A47B 57/56; A47B 57/46; A47B 57/045; A47B 96/022; A47B 96/027; A47B 96/02; A47B 96/021; A47B 96/061; A47B 96/067; A47K 3/281
USPC ..................... 211/88.01, 90.01, 134
See application file for complete search history.

(56) References Cited

U.S. PATENT DOCUMENTS 2,828,044 A * 3/1958 Reiss ............... A47B 88/20 206/561
2,911,108 A * 11/1959 Nield ................ 108/152
(Continued)

FOREIGN PATENT DOCUMENTS

CN 2155792 Y 2/1994
CN 2174147 Y 8/1994
(Continued)

OTHER PUBLICATIONS

Search Report dated Aug. 8, 2012 issued in corresponding DE patent application No. 10 2012 015 574.3 (and partial English translation).
(Continued)

*Primary Examiner* — Brian Glessner
*Assistant Examiner* — Paola Agudelo
(74) *Attorney, Agent, or Firm* — Posz Law Group, PLC (57) ABSTRACT

The invention relates to an arrangement for fastening a shelf device for bathroom and/or shower implements, to a wall of a room that is provided with a wall coating, wherein the shelf device comprises a basis element extending substantially in a horizontal plane, at least one angled peripheral web, and at least one flange, which is arranged underneath the wall coating of the wall of the room.

14 Claims, 4 Drawing Sheets

(51) Int. Cl.
   *A47B 47/02* (2006.01)
   *A47B 96/02* (2006.01)

(56) References Cited

U.S. PATENT DOCUMENTS

| | | | | |
|---|---|---|---|---|
| 2,922,248 | A * | 1/1960 | Kocsi | 248/311.2 |
| 2,930,505 | A | 3/1960 | Meyer | |
| D206,257 | S * | 11/1966 | Maurus | D32/55 |
| 4,708,310 | A * | 11/1987 | Smith | 248/220.1 |
| 4,886,236 | A * | 12/1989 | Randall | A47B 96/022 |
| | | | | 108/152 |
| 5,647,566 | A | 7/1997 | Kump | |
| 5,954,306 | A * | 9/1999 | Hoover | 248/250 |
| 5,992,654 | A * | 11/1999 | Dente, Jr. | A47B 96/022 |
| | | | | 211/90.01 |
| 6,079,336 | A | 6/2000 | Lindstrom | |
| 6,688,238 | B1 * | 2/2004 | Alexiou | A47K 3/281 |
| | | | | 108/42 |
| 7,987,535 | B1 * | 8/2011 | Tesch | A47C 15/002 |
| | | | | 108/42 |
| D654,745 | S * | 2/2012 | Chuang | D6/562 |
| 8,857,109 | B1 * | 10/2014 | Kirby | A47K 3/282 |
| | | | | 211/119.009 |
| 2008/0237169 | A1 * | 10/2008 | May | A47B 23/00 |
| | | | | 211/195 |
| 2011/0049065 | A1 * | 3/2011 | Katz | 211/35 |
| 2011/0167746 | A1 * | 7/2011 | Scalise | 52/391 |

FOREIGN PATENT DOCUMENTS

| | | |
|---|---|---|
| CN | 2282362 Y | 5/1998 |
| CN | 2618542 Y | 6/2004 |
| DE | 957 259 B | 1/1957 |
| DE | 91 11 470 U1 | 1/1992 |
| DE | 295 10 973 U1 | 12/1995 |
| DE | 299 13 192 U1 | 10/1999 |
| DE | 202 12 950 U1 | 2/2004 |
| DE | 10 2004 036 923 A1 | 3/2006 |
| DE | 20 2007 010 227 U1 | 10/2007 |
| FR | 1 560 077 A | 3/1969 |
| GB | 2 159 039 A | 11/1985 |

OTHER PUBLICATIONS

International Search Report of the International Searching Authority dated Nov. 21, 2013 issued in corresponding International Application No. PCT/EP2013/066050.
International Preliminary Report on Patentability dated Feb. 10, 2015 issued in corresponding International Application No. PCT/EP2013/066050.
Office Action dated Mar. 10, 2016 issued in corresponding CN patent application No. 201380041991.1 (and English summary from Chinese associate).

* cited by examiner

ARRANGEMENT FOR FASTENING A SHELF DEVICE

CROSS REFERENCE TO RELATED APPLICATIONS

This application is a U.S. national stage application of International Patent Application No. PCT/EP2013/066050 filed on Jul. 31, 2013, and claims priority to, and incorporates by reference, German Patent Application No. 10 2012 015 574.3 filed on Aug. 8, 2012.

PRIOR ART

The invention relates to an arrangement for fastening a shelf device, according to the preamble of the independent patent claim 1.

From the prior art a variety of implementations of an arrangement for fastening a shelf device are known. The shelf devices are usually fastened to a tiled wall of a room or directly to a wall coating, in a bathroom or in a shower, and serve to provide opportunities for depositing bathroom implements and/or shower implements, e.g. gadgets, soaps, bottles, mugs, textiles and the like. As a fastening of the shelf device is normally done on the coating of the wall, the wall coating and the foundation applied to the wall of the room can be damaged. There is a risk of damage to the wall coating in case of a subsequent mounting of the shelf device, in an expert as well as an inexpert or inadequate mounting of the shelf device. However, the mounting of the shelf device is often not done by an expert, as a result of which, for example, usage of non-rustproof screws or insufficient fastening may result in a negative optical effect on the coating of the wall or in an injury risk for an individual who is in the shower or in the bathroom. A subsequently mounted shelf device often does not have a durable or secure fastening to the wall coating, or loses its dimensional stability respectively is deformed, as a result of which it may become unusable in a short period of time.

From an advertising brochure of the company Dansani an arrangement for fastening a shelf device for bathroom and/or shower implements at a wall of a room that is provided with a wall coating is known. The shelf device comprises a basis element substantially extending in a horizontal plane and at least one angled peripheral web. To the purpose of fastening the shelf device to a tiled wall of a room respectively directly to a wall coating in a bathroom or in a shower, the shelf device is either arranged in a joint between the wall coating and then grouted or it is subsequently mounted onto the wall coating by way of milling a slot either into the wall coating or into the joint between the wall coating and then grouting said slot.

The invention is in particular based on the task to provide an arrangement for fastening a shelf device which allows a secure and optically appealing mounting of the shelf device.

The task is solved according to the invention by the features of patent claim 1, while further implementations of the invention may be gathered from claims 2 to 11.

The invention is based on an arrangement for fastening a shelf device for bathroom and/or shower implements at a wall of a room which is provided with a wall coating, wherein the shelf device comprises a basis element substantially extending in a horizontal plane and at least one angled peripheral web. It is proposed that the shelf device comprises at least one flange extending in a vertical plane, which is arranged underneath the wall coating of the wall of the room. In this context, a "horizontal plane" is to be understood, in particular, as an orientation of the extending basis element arranged substantially orthogonally with respect to the main extension direction of the wall of the room, which orientation may differ from an orthogonal orientation preferably by no more than 2°.

An essential advantage of the invention lies in the shelf device comprising at least one flange extending in a vertical plane, which is arranged underneath a wall coating of the wall of the room. Another essential advantage is the flange of the shelf device being fastened at a wall of a room on both sides and over a large area, wherein "on both sides" is to mean, in this context, in particular one flange area at the wall-coating side and one flange area at the side of the wall of the room. On the one hand, the flange area at the side of the wall of the room can be fastened to the wall of the room and, on the other hand, the flange area at the wall-coating side can be covered by the wall coating and can also be pressed to the wall of the room. A simple mounting of the shelf device prior to applying the wall coating to the wall of the room can thus be advantageously effected, as a result of which the flange of the shelf device can be covered by the wall coating and is hence not visible after applying the wall coating to the wall of the room. Thus a particularly quick mounting and an effortless tiling around the shelf device can be effected while applying the wall coating. In comparison to the conventional arrangement of the shelf device, wherein the shelf device is fastened to a tiled wall of a room respectively directly to a wall coating, the risk of damaging the wall coating can be eliminated in the arrangement according to the invention. Furthermore, due to the structural element protruding in one piece from the wall of the room, a stable respectively secure arrangement of the shelf device at the wall of the room is possible and an optically particularly appealing shelf device is mountable in a shower or in a bathroom.

In one embodiment of the invention the at least one flange extends above and/or below the basis element. Advantageously increasing area size of the flange can result in an increasing abutment area of the flange with the wall of the room, allowing a secure multiple fastening of the shelf device above and/or below the basis element, and due to which the steadfastness and carrying capacity of the fastened shelf device may be increased. The flange of the shelf device, which is arranged above and/or below the basis element, can be manufactured simply and cheaply from a plate in an advantageous manner and can, due to the large abutment area, be mounted to a wall of a room quickly and securely, without mounting mistakes.

In a further embodiment of the invention the basis element comprises a run-off device. Thereby an undesired permanent wetting by water and/or washing lotion as well as sediments caused by water and/or washing lotion can be avoided, as a result of which the shelf device can meet high-level hygiene requirements and the bathroom implements and/or shower implements can always be deposited on the shelf device without slippage.

It is proposed that the at least one peripheral web extends above and/or below the basis element. Bathroom implements and/or shower implements deposited on the basis element can thus be advantageously prevented from slipping off and a risk of an individual being in a bathroom and/or a shower being injured at the shelf device can be advantageously minimized.

It is further proposed that the basis element, the at least one flange and the at least one peripheral web of the shelf device form a tub-shaped receptacle for receiving a wall coating. Advantageously, this may result in an elegant shelf device with a particularly high degree of optical adaptability, as the shelf device can be optically adapted to all tile designs, decoration elements respectively mineral decorations of the wall coating. Furthermore the shelf device can also be equipped with a decoration element differing from the wall coating, as an eye-catching contrast element to the wall coating, or can, for example, be rotated by 180° and it can be mounted to the wall of the room as a shelf device in a neutral, elegant design, without a wall coating. The tub-shaped implementation of the shelf device may allow an especially dimensionally stable embodiment of the shelf device, which can be manufactured as a cost-competitive mass product and can individually be touched up optically with the wall coating. When redoing of the wall coating in a bathroom or in a shower is planned, the wall coating can subsequently be replaced in the shelf device and can thus be adapted to the new wall coating.

In one embodiment it is proposed that the at least one flange comprises recesses for fastening to the wall of the room. Thereby the recesses can advantageously allow a connection of the wall coating with the wall of the room inside the flange as well, as a result of which the shelf device can be multiply fixed, such that it is orientated, in its position at the wall of the room respectively at the wall coating.

In another embodiment it is proposed that the recesses of the flange are provided for receiving a bonding agent and/or fastening elements. In an advantageous manner, the shelf device can be multiply fastened to the wall of the room via at least two different types of fastening, as a result of which an especially stable shelf device with high carrying capacity may be provided.

It is further proposed that the basis element has a polygonal or a rotund basic shape. Advantageously the shelf device can be manufactured in a huge variety of implementation shapes respectively in different implementation sizes and can thus be adapted to the architecture, to the spatial conditions in a bathroom or a shower and to the requirements of an individual. Basically, all implementation shapes respectively implementation sizes of the shelf device can particularly advantageously be fastened in a corner region in a space-saving manner, while rotund and quadrilateral shelf devices have a large deposition area and can ideally be fastened to only one wall.

A preferred realization of the arrangement according to the invention provides a basis element that is made of a rustproof metal or of a synthetic material or of a composite material. Advantageously particularly long-life shelf devices with particularly high-value water-compatible construction materials can thus be provided, which are suitable for approximately all tile designs, decoration elements respectively mineral decorations of the wall coating.

A preferred implementation of the invention provides a shelf device with a wall coating which is received in the tub-shaped receptacle. Hereby the shelf device is advantageously optically adaptable to the surroundings by inserting a pre-cut wall coating.

In one embodiment it is proposed that a silicone sealing mass compatible with the material of the shelf device is applied between the wall coating of the shelf device and the wall coating of the wall of the room. Thereby the hollow spaces and the transitions between the wall coating of the shelf device and the wall coating at the wall of the room can be sealed off respectively optically covered up, thus allowing additional enhancement of the running off of the water. The silicone sealing mass can additionally fixate the shelf device in an advantageous manner.

DRAWINGS

Further advantages may be gathered from the following description of the drawings. In the drawings five exemplary embodiments of the invention are shown. The drawings, the description and the claims contain a plurality of features in combination. The individual skilled in the art will purposefully also consider the features separately and will arrange them in further expedient combinations. Only one respective component of equivalent components in a figure is designated.

It is shown in.

DESCRIPTION OF THE EXEMPLARY EMBODIMENTS

Figure 1:
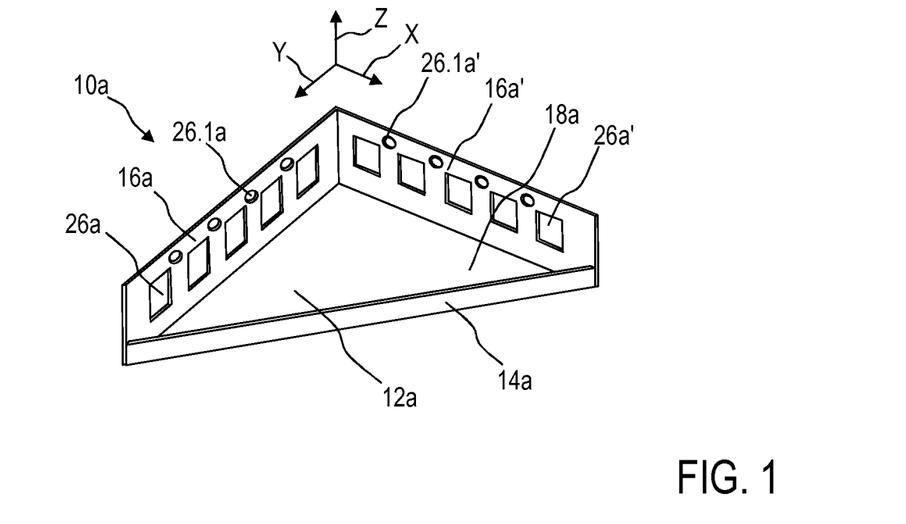
FIG. 1 a first exemplary embodiment of a shelf device, with a triangular basis element, with two flanges of identical length, which are arranged at the edges of the basis element, and with a peripheral web arranged at a further edge of the basis element, in a schematic presentation, FIG. 2 a second exemplary embodiment of the shelf device, with a triangular basis element, with two flanges differing in length and arranged at the edges of the basis element and with a peripheral web arranged at a further edge of the basis element, in a schematic presentation, FIG. 3 a third exemplary embodiment of the shelf device, with an oblong basis element, with a flange arranged at a long edge of the basis element and with three peripheral webs arranged at further three edges of the basis element, in a schematic presentation, FIG. 4a a fourth exemplary embodiment of the shelf device, with an oblong basis element, with a first flange arranged at the long edge of the basis element and above the basis element, and with a second flange arranged below the basis element and opposite the first flange, and with three peripheral webs arranged at three further edges of the basis element, in a lateral view, FIG. 4b the fourth exemplary embodiment of the shelf device from FIG. 4a, in a further lateral view, FIG. 5 a fifth exemplary embodiment of a shelf device, with an oblong basis element, with two flanges differing in length and arranged at the edges of the basis element and with two peripheral webs arranged at further two edges of the basis element, in a schematic view, FIG. 6 the shelf device from FIG. 1 with a wall coating, in a schematic view, FIG. 7 the shelf device from FIG. 5 with a wall coating, in a schematic view, and FIG. 8 an arrangement according to the invention for fastening a shelf device, with the shelf device from FIG. 6, in a schematic view.
Figure 2:
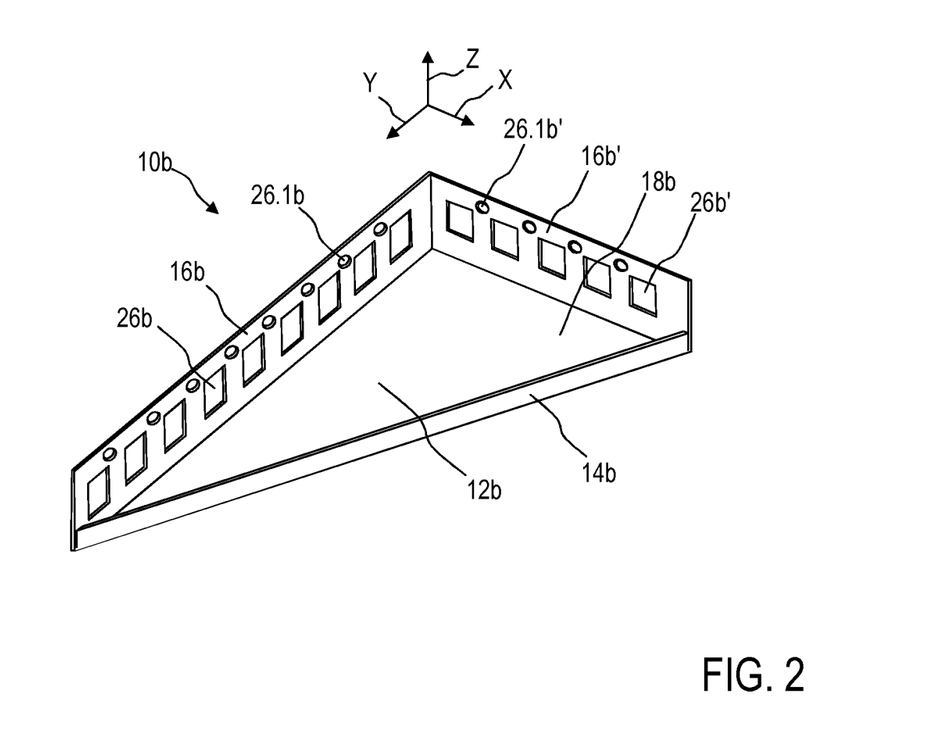
Figure 3:
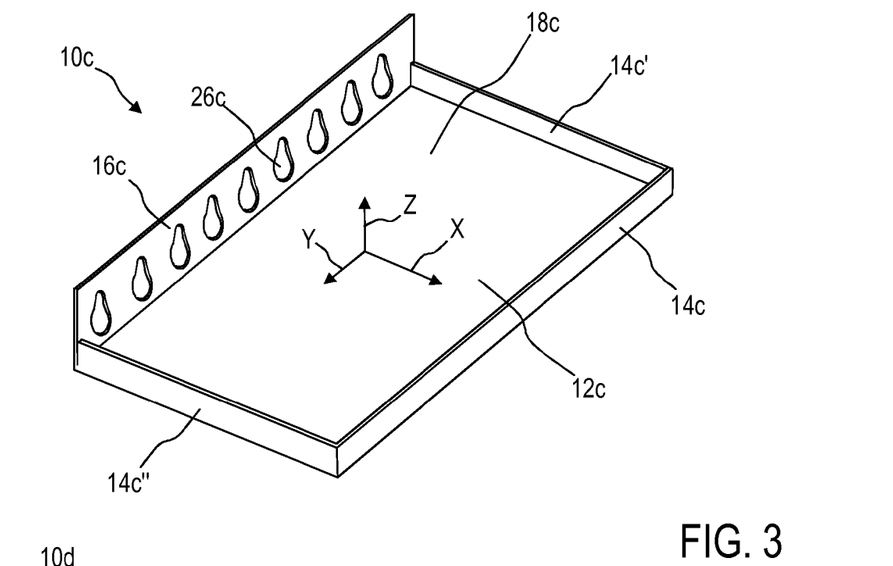
Figure 4A:
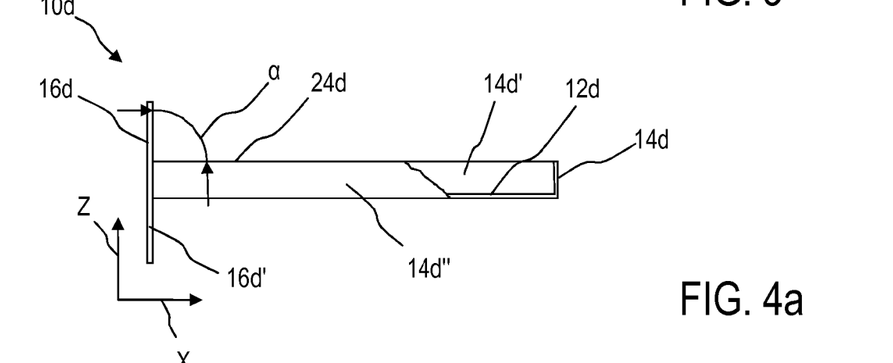
Figure 4B:
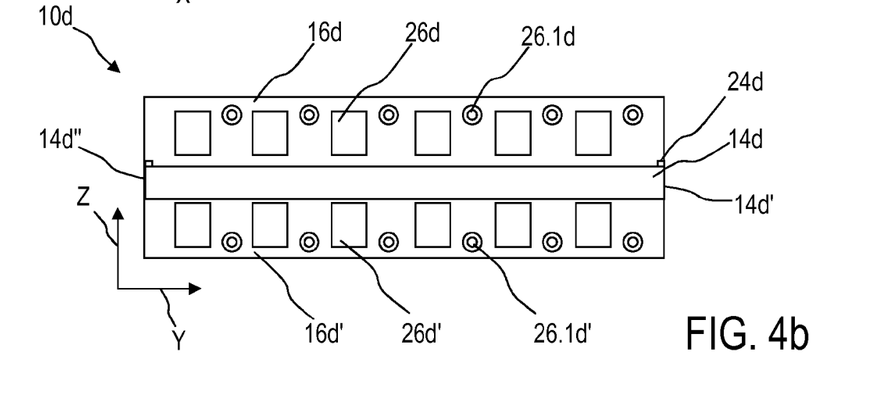
Figure 5:
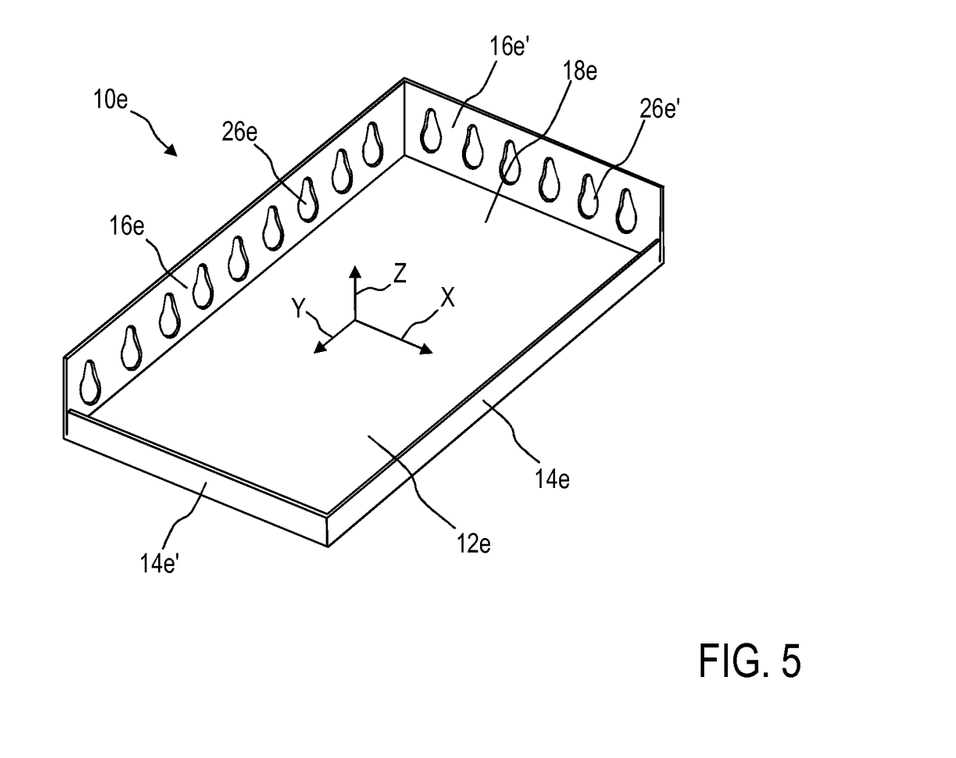

FIG. 9 shows an arrangement according to the invention for fastening a shelf device $10a$; $10b$; $10c$; $10d$; $10e$ for bathroom and/or shower implements to a wall 22 of a room that is provided with a wall coating 20. The shelf device $10a$; $10b$; $10c$; $10d$; $10e$ comprises a basis element $12a$; $12b$; $12c$; $12d$; $12e$ extending substantially in a horizontal plane XY and at least one angled peripheral web $14a$; $14b$; $14c$; $14c'$; $14c''$; $14d$; $14d'$; $14d''$; $14e$; $14e'$. The shelf device $10a$; $10b$; $10c$; $10d$; $10e$ can be embodied in a variety of shapes and sizes and is mounted to a wall 22 of a room, namely a bathroom or a shower. Herein a mounting in a corner region is possible as well as in a planar region of the wall 22 of the room. Five exemplary embodiments of the shelf device 10a; 10b; 10c; 10d; 10e are shown in FIGS. 1 to 5, the invention not being restricted to the exemplary embodiments described but potentially comprising all implementations of the shelf device 10a; 10b; 10c; 10d; 10e that have the same effect in accordance with the invention. Preferably the basis element 12a; 12b; 12c; 12d; 12e is made of a rustproof metal, a synthetic material or a composite material. On a client's requirement, however, an implementation of other materials is also possible or an implementation of a combination of the previously mentioned materials. Individualizing the shelf device 10a; 10b; 10c; 10d; 10e by providing it with a logo of the client is also conceivable.

To the purpose of providing an arrangement for fastening a shelf device 10a; 10b; 10c; 10d; 10e, which allows a secure and optically appealing mounting of the shelf device 10a; 10b; 10c; 10d; 10e, it is proposed according to the invention that the shelf device 10a; 10b; 10c; 10d; 10e comprises at least one flange 16a; 16a'; 16b; 16b'; 16c; 16d; 16d'; 16e; 16e', which extends in a vertical plane XZ, YZ and is arranged underneath the wall coating 20 of the wall 22 of the room.

Figure 6:
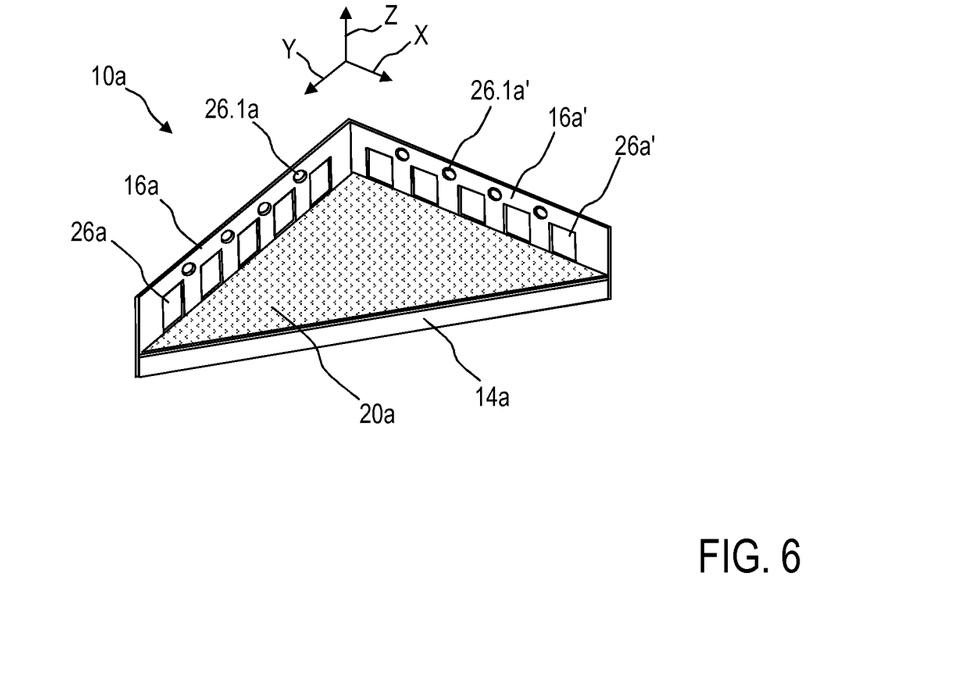
Figure 7:
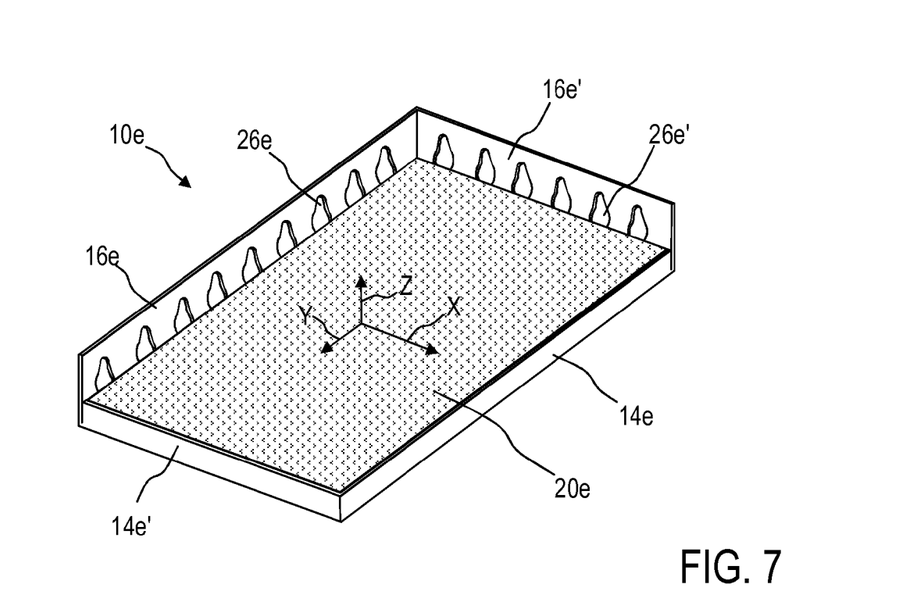

In the five exemplary embodiments according to FIGS. 1 to 5, the at least one flange 16a; 16a'; 16b; 16b'; 16c; 16d; 16d'; 16e; 16e' can extend above and/or below the basis element 12a; 12b; 12c; 12d; 12e. FIGS. 1, 2, 5, 6 and 7 show a first, a second and a fifth exemplary embodiment of a shelf device 10a; 10b; 10e with a triangular basis element 12a; 12b; 12e, with two flanges 16a; 16a'; 16b; 16b'; 16e; 16e' arranged orthogonally to each other at the edges of the basis element 12a; 12b; 12e, wherein the flanges 16b; 16b'; 16e; 16e' of the basis elements 12b; 12e can have differing lengths. It can be seen in FIGS. 3, 4a and 4b that in the third exemplary embodiment according to FIG. 3, the shelf device 10c having an oblong basis element 12c comprises only one flange 16c arranged at a long edge of the basis element 12c above the basis element 12c and, in the fourth exemplary embodiment according to FIGS. 4a and 4b, the shelf device 10d having an oblong basis element 12d comprises a first flange 16d at the long edge of the basis element 12d above the basis element 12d as well as a second flange 16d' arranged below the basis element 12d opposite the first flange 16d. Of course other lengths, heights and shapes of the flange 16a; 16a'; 16b; 16b'; 16c; 16d; 16d'; 16e; 16e' deemed expedient by an individual skilled in the art are also conceivable, e.g. interruptions and/or differing heights of the flange 16a; 16a'; 16b; 16b'; 16c; 16d; 16d'; 16e; 16e'.

To the purpose of reducing sedimentations and a permanent wetting of the shelf device 10a; 10b; 10c; 10d; 10e with water, thus fulfilling the hygienic requirements, the basis element 12a; 12b; 12c; 12d; 12e comprises a run-off device 24d. In a first implementation the run-off device 24 may be implemented as a decline of the basis element 12a; 12b; 12c; 12d; 12e. To this purpose the basis element 12a; 12b; 12c; 12d; 12e comprises, with the horizontal plane XY in a direction of an x-axis and/or in a direction of a y-axis a decline with a run-off angle $\alpha$, which can include between the flange 16a; 16a'; 16b; 16b'; 16c; 16d; 16d'; 16e; 16e' and the basis element 12a; 12b; 12c; 12d; 12e a run-off angle $\alpha > 90°$, in particular a run-off angle $\alpha$ of 92°. As a result of this the shelf device 10a; 10b; 10c; 10d; 10e is inclined downward towards a vertical plane XZ and/or a vertical plane YZ and can ensure a dry and secure depositing surface of the shelf device 10a; 10b; 10c; 10d; 10e for bathroom and/or shower implements. In further implementations the run-off device 24 of the shelf device 10a; 10b; 10c; 10d; 10e can be implemented, additionally or as an alternative, with notches and/or grooves (not depicted here), which are preferably provided in the basis element 12a; 12b; 12c; 12d; 12e.

In a further implementation the shelf device 10a; 10b; 10c; 10d; 10e can comprise stabilizing devices for bathroom and/or shower implements, e.g. hollows and/or nobs, which are not depicted here.

Figure 8:
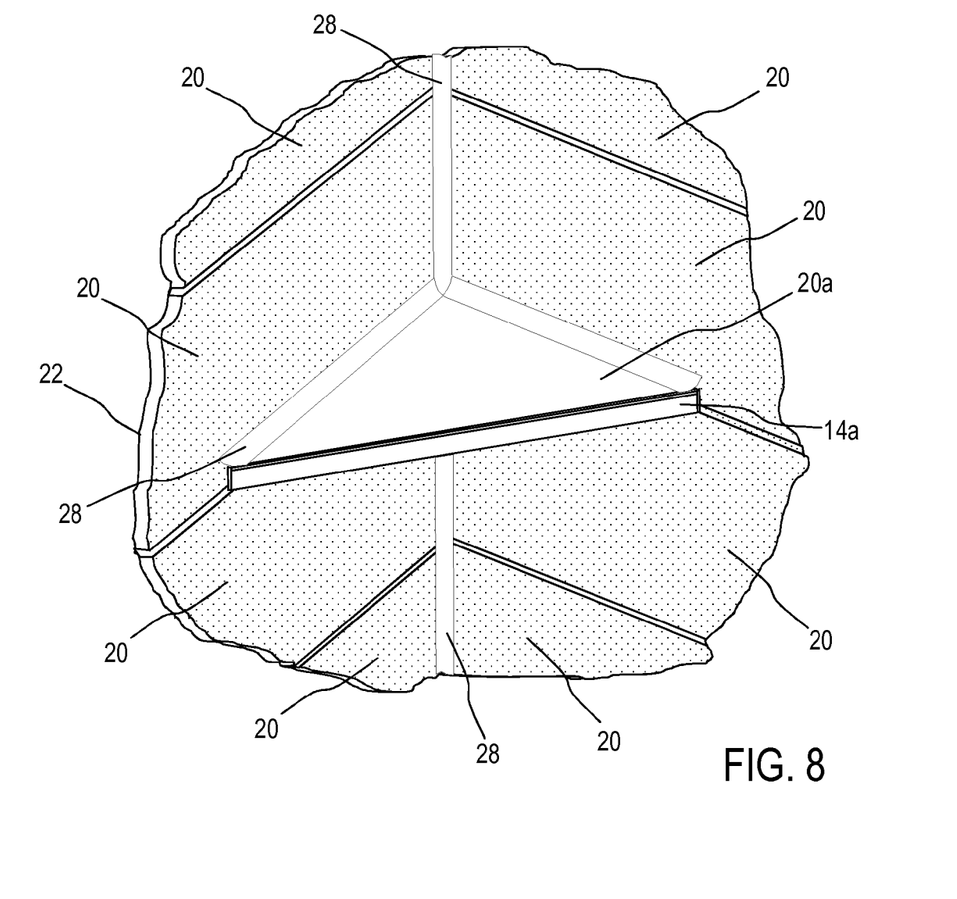

As can be seen in FIGS. 1 to 8, in all five exemplary embodiments the at least one peripheral web 14a; 14b; 14c; 14c'; 14c"; 14d; 14d'; 14d"; 14e; 14e' extends above and/or below the basis element 12a; 12b; 12c; 12d; 12e. The peripheral web 14a; 14b; 14c; 14c'; 14c"; 14d; 14d'; 14d"; 14e; 14e' thus forms an optical and a geometrical closure of the shelf device 10a; 10b; 10c; 10d; 10e and is preferably oriented towards an individual situated in a bathroom or a shower. In the present exemplary embodiments the basis element 12a; 12b; 12c; 12d; 12e, the at least one flange 16a; 16a'; 16b; 16b'; 16c; 16d; 16d'; 16e; 16e' and the at least one peripheral web 14a; 14b; 14c; 14c'; 14c"; 14d; 14d'; 14d"; 14e; 14e' of the shelf device 10a; 10b; 10c; 10d; 10e form a tub-shaped receptacle 18a; 18b; 18c; 18d; 18e for receiving a wall coating 20a; 20e. The function of the peripheral web 14a; 14b; 14c; 14c'; 14c"; 14d; 14d'; 14d"; 14e; 14e' embodied as a planar element is in particular a peripheral-side limitation for the inserted wall coating 20a; 20e, serving simultaneously as an edge protection for individuals who are in a bathroom or a shower. As the shelf device 10a; 10b; 10c; 10d; 10e can also be used with the tub-shaped receptacle 18a; 18b; 18c; 18d; 18e which is oriented upwards or downwards, without a wall coating 20a; 20e, the peripheral web 14a; 14b; 14c; 14c'; 14c"; 14d; 14d'; 14d"; 14e; 14e' can function as an anti-slip protection for the bathroom and/or shower implements deposited on the shelf device 10a; 10b; 10c; 10d; 10e and/or as an edge protection for individuals who are in a bathroom or in a shower. Manufacturing of the tub-shaped shelf device 10a; 10b; 10c; 10d; 10e can be carried out from a rustproof metal from a plurality of separate parts by means of a jointing technique, e.g. welding, or from a one-part pre-fabricated plate by deep-drawing, or from a synthetic material by injection molding, wherein however other materials and procedures deemed expedient by an individual skilled in the art for manufacturing the shelf device 10a; 10b; 10c; 10d; 10e are also conceivable.

To ensure secure fastening of the shelf device 10a; 10b; 10c; 10d; 10e at a wall 22 of a room, the at least one flange 16a; 16a; 16b; 16b'; 16c; 16d; 16d'; 16e; 16e' comprises recesses 26a; 26a; 26b; 26b'; 26c; 26d; 26d'; 26e; 26e'; 26.1a; 26.1a'; 26.1b; 26.1b'; 26.1d; 26.1d' for fastening at the wall 22 of the room. As can be seen from FIGS. 1 to 7, the recesses 26a; 26a; 26b; 26b'; 26c; 26d; 26d'; 26e; 26e'; 26.1a; 26.1a'; 26.1b; 26.1b'; 26.1d; 26.1d' can be implemented in different manners. Basically the recesses 26a; 26a; 26b; 26b'; 26c; 26d; 26d'; 26e; 26e'; 26.1a; 26.1a'; 26.1b; 26.1b'; 26.1d; 26.1d' of the flange 16a; 16a; 16b; 16b'; 16c; 16d; 16d'; 16e; 16e' are provided to receive a bonding agent and/or fastening elements. For example, a tile adhesive or a comparable material with adhesive characteristics is provided as a bonding agent and counter-sunk screws made of a rustproof material and plugs with self-sealing characteristics are provided as fastening elements. In the first, second and fourth exemplary embodiments according to FIGS. 1, 2, 4a, 4b and 6 the recesses 26a; 26a; 26b; 26b'; 26d; 26d'; 26.1a; 26.1a'; 26.1b; 26.1b'; 26.1d; 26.1d' of the flange 16a; 16a; 16b; 16b'; 16d; 16d' for receiving a bonding agent and fastening elements are implemented separately. The recesses 26a; 26a'; 26b; 26b'; 26d; 26d' of the flange 16a; 16a; 16b; 16b'; 16d; 16d' are preferably provided for receiving a bonding agent and the recesses 26.1a; 26.1a';

26.1*b*; 26.1*b'*; 26.1*d*; 26.1*d'* of the flange 16*a*; 16*a'*; 16*b*; 16*b'*; 16*d*; 16*d'* are preferably provided for receiving fastening elements (not shown here). As an alternative, the recesses 26*c*; 26*e*; 26*e'* of the flange 16*c*; 16*e*; 16*e'* for receiving a bonding agent and fastening elements can be implemented in a shared recess 26*c*; 26*e*; 26*e'* of the flange 16*c*; 16*e*; 16*e'*, in the third and fifth exemplary embodiments according to FIGS. 3, 5 and 7. The recess 26.1*a*; 26.1*a'*; 26.1*b*; 26.1*b'*; 26.1*d*; 26.1*d'* of the flange 16*a*; 16*a'*; 16*b*; 16*b'*; 16*d*; 16*d'* respectively the tapering region of the recess 26*c*; 26*e*; 26*e'*, which serves to receive the screw head of a counter-sunk screw, comprises a hollow for plane-flush screwing with the flange 16*a*; 16*a'*; 16*b*; 16*b'*; 16*c*; 16*d*; 16*d'*; 16*e*; 16*e'*, such that protruding of the screw head may be avoided. Advantageously in all exemplary embodiments the shelf device 10*a*; 10*b*; 10*c*; 10*d*; 10*e* can be fastened at the wall 22 of the room in a defined end position by means of the screwing.

In one embodiment the basis element 12*a*; 12*b*; 12*c*; 12*d*; 12*e* can have a polygonal basic shape and in an alternative embodiment the basis element 12*a*; 12*b*; 12*c*; 12*d*; 12*e* can have a rotund basic shape, the rotund implementation of the basic shape being, for example, oval, elliptic, circular or a combination thereof. All five exemplary embodiments according to FIGS. 1 to 8 present a triangular or an oblong basic shape of the basis element 12*a*; 12*b*; 12*c*; 12*d*; 12*e*, wherein the rotund basic shapes of the basis element, which are not shown here, can be embodied as a circle-portion shaped, a semicircle-shaped or a circle-quadrant shaped basic shape.

In the exemplary embodiments depicted according to FIGS. 1 to 8 a wall coating 20*a*; 20*e* is provided, which is received in the tub-shaped receptacle 18*a*; 18*b*; 18*c*; 18*d*; 18*e*, wherein the wall coating 20*a*; 20*e* can be identical to the wall coating 20 of the wall 22 of the room or may be a wall coating of a different type. As can be seen from FIGS. 6, 7 and 8, when the shelf device 10*a*; 10*b*; 10*c*; 10*d*; 10*e* is mounted, in a first procedure step the wall coating 20*a*; 20*e* can be glued into the receptacle 18*a*; 18*b*; 18*c*; 18*d*; 18*e* preferably by means of a silicone sealing mass 28, e.g. a neutral silicone respectively a non-etching silicone material. Preferentially neutral silicone is applied, such that the surface of the shelf device 10*a*; 10*b*; 10*c*; 10*d*; 10*e*, which is made of a rustproof material, cannot be damaged. Partial regions of the wall 22 of the room can already be tiled with the wall coating 20, such that then the shelf device 10*a*; 10*b*; 10*c*; 10*d*; 10*e* can be matched to a lower edge of the wall coating 20 at a desired point of the wall 22 of the room. In a second procedure step the shelf device 10*a*; 10*b*; 10*c*; 10*d*; 10*e* cam be fastened to the wall 22 of the room by means of a bonding agent and/or fastening elements and can then be tiled, before remaining areas of the walls 22 of the room with the wall coating 20 are fully tiled. In a third procedure step a silicone sealing mass 28, which is compatible with the construction material of the shelf device 10*a*; 10*b*; 10*c*; 10*d*; 10*e*, is applied between the wall coating 20*a*; 20*e* of the shelf device 10*a*; 10*b*; 10*c*; 10*d*; 10*e* and the wall coating 20 of a wall 22 of the room.

REFERENCE NUMERALS

10*a*; 10*b*; 10*c*; 10*d*; 10*e* shelf device
12*a*; 12*b*; 12*c*; 12*d*; 12*e* basis element
14*a*; 14*b*; 14*c*; 14*d*; 14*e*; 14*c'*; 14*c''*; 14*d'*; 14*d''*; 14*e'* peripheral web
16*a*; 16*b*; 16*c*; 16*d*; 16*e*; 16*a'*; 16*b'*; 16*d'*; 16*e'* flange
18*a*; 18*b*; 18*c*; 18*d*; 18*e* receptacle
20; 20*a*; 20*e* wall coating
22 wall (of a room)
24*d* run-off device
26*a*; 26*b*; 26*c*; 26*d*; 26*e*; 26*a'*; 26*b'*; 26*d'*; 26*e'* recess (bonding agent)
26.1*a*; 26.1*b*; 26.1*d*; 26.1*a'*; 26.1*b'*; 26.1*d'* recess (fastening element)
28 silicone sealing mass
α run-off angle
XY horizontal plane
XZ vertical plane

The invention claimed is:

1. An arrangement comprising a shelf device, for bathroom and/or shower implements, fastened to a wall of a room that is provided with a wall coating, the shelf device comprising:
   a basis element extending substantially in a horizontal plane;
   at least one angled marginal web; and
   at least one flange, which is arranged underneath the wall coating of the wall of the room, wherein
   the basis element, the at least one flange, and the at least one marginal web of the shelf device form a tub-shaped receptacle for receiving a further wall coating,
   the marginal web, embodied as a planar element, is provided as a peripheral-side limitation of the further wall coating,
   the basis element is embodied as a flat plate which is embodied free of recesses, and
   the basis element, the at least one angled marginal web, and the at least one flange are embodied in one piece.

2. The arrangement according to claim 1, wherein the at least one flange extends above and below the basis element.

3. The arrangement according to claim 1, wherein the basis element comprises a run-off device.

4. The arrangement according to claim 1, wherein the at least one marginal web extends above and/or below the basis element.

5. The arrangement according to claim 1, wherein the at least one flange comprises recesses for fastening to the wall of the room.

6. The arrangement according to claim 1, wherein the recesses of the at least one flange are provided for receiving a bonding agent and/or fastening elements.

7. The arrangement according to claim 1, wherein the basis element has a polygonal or a rotund basic shape.

8. The arrangement according to claim 1, wherein the basis element is made of a rustproof metal or of a synthetic material or of a composite material.

9. The arrangement according to claim 1, wherein the further wall coating is received in the tub-shaped receptacle.

10. The arrangement according to claim 1, wherein the further wall coating is inserted in the tub-shaped receptacle, and is replaceably mounted.

11. The arrangement according to claim 1, wherein the marginal web is in a mounted state at least substantially arranged flush with the further wall coating in the horizontal plane.

12. The arrangement according to claim 1, wherein the basis element as a whole is inclined relative to the at least one flange with an angle which is different from 90°.

13. The arrangement according to claim 1, wherein
the shelf device comprises at least a second flange, which is arranged underneath the wall coating of the wall of the room, and
the at least one flange and the at least second flange have different lengths.

14. An arrangement comprising a shelf device, for bathroom and/or shower implements, fastened to a wall of a room that is provided with a wall coating, the shelf device comprising:
a basis element extending substantially in a horizontal plane;
at least one angled marginal web; and
at least one flange, which is arranged underneath the wall coating of the wall of the room, wherein
the basis element, the at least one flange, and the at least one marginal web of the shelf device form a tub-shaped receptacle for receiving a further wall coating,
the marginal web, embodied as a planar element, is provided as a peripheral-side limitation of the further wall coating,
the basis element is embodied as a flat plate which is embodied free of recesses,
the basis element, the at least one angled marginal web, and the at least one flange are embodied in one piece by deep-drawing, and
the basis element as a whole is inclined relative to the at least one flange with an angle which is different from 90°.

* * * * *